(No Model.)
A. SAMPER.
SYSTEM FOR TRANSMITTING MOTION.
No. 253,429. Patented Feb. 7, 1882.
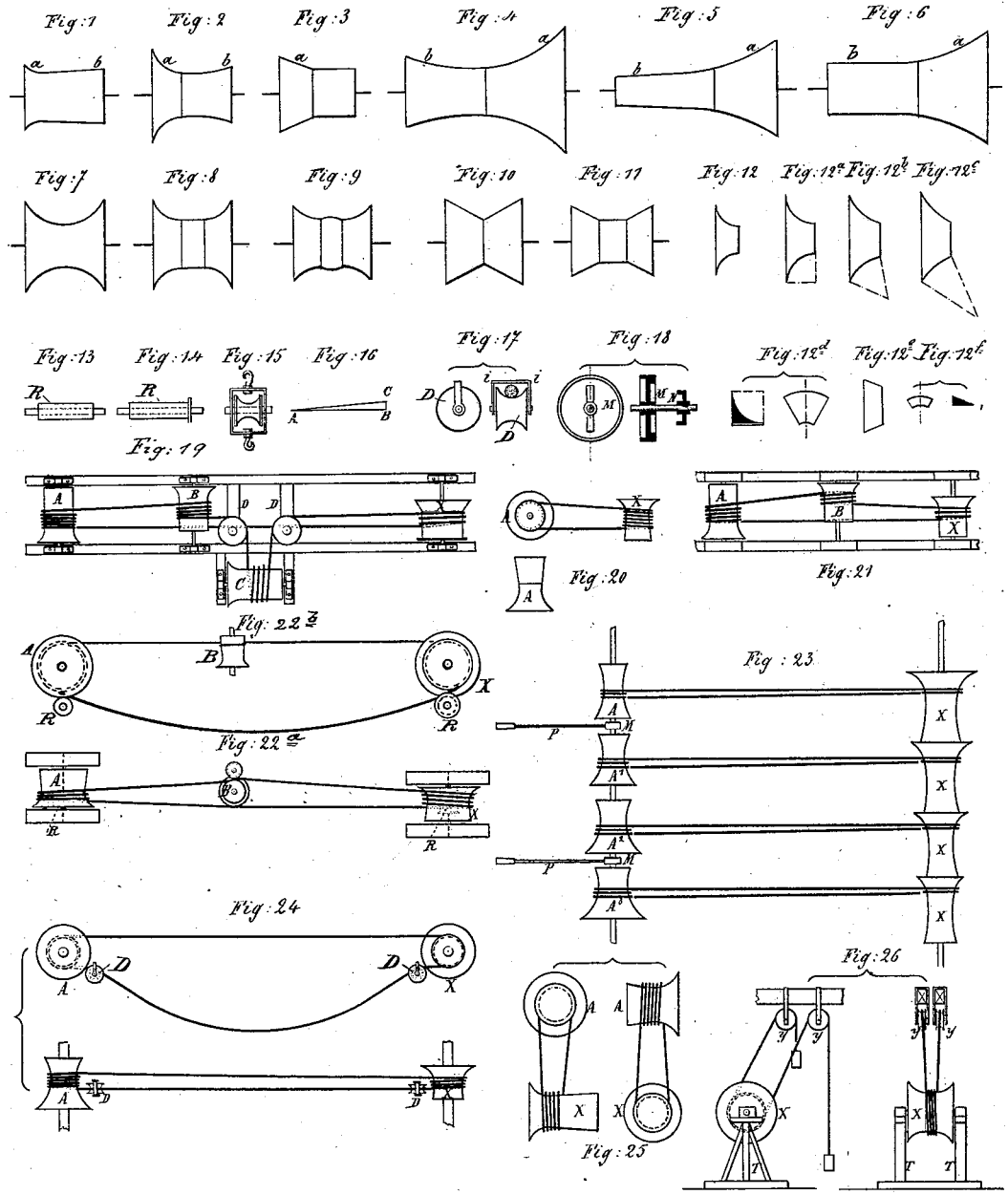
Witnesses:
1. Ralt McHaopes
2. Jean-Baptiste Rolland
Inventor:
Antonio Samper

UNITED STATES PATENT OFFICE.

ANTONIO SAMPER, OF PARIS, FRANCE.

SYSTEM FOR TRANSMITTING MOTION.

SPECIFICATION forming part of Letters Patent No. 253,429, dated February 7, 1882.

Application filed October 21, 1881. (No model.)

*To all whom it may concern:*

Be it known that I, ANTONIO SAMPER, of Paris, France, have invented a System of Transmission of Movement; and I do hereby declare that the following is a full, clear, and exact description of the same, reference being had to the annexed sheet of drawings, making a part of the same.

The present application for a patent relates to improvements in my system of transmission of movement patented on the 21st June, 1881, under the number 243,226. These improvements will be easily seen by comparing the present description and the annexed drawings with those of the patent of the 21st of June.

The present improvements, which are represented in Figures 1 to 11, consist in the form of the pulleys serving to regulate and complete the force transmitted by the ropes, the peculiar form given to the pieces 12 $12^a$ $12^b$ $12^c$ $12^e$ $12^f$, for allowing the pulleys used in the previous systems to be applied to the present one, and in all the pieces and arrangements shown in the annexed drawings which contribute to control and regulate the effect produced by the movement of the rope, as represented in Figs. 13, 14, and 17. In the present system no tension exists between the shafts which transmit the motion, as in the case of transmission by bands, where the mutual tension of the shafts is inevitable. In the present case the rope is wound spirally round the shafts, and tension only takes place between said cord and the pulley round which it passes, so as to increase its adherence. The effect of the tension is simply to neutralize the tightness of the ropes. It diminishes if the latter be flexible and well tightened, and if the circumference of the pulleys on which it bears tends to increase. This increase of the circumference may be avoided by taking several turns of the rope round the said pulleys. By these means the tension is reduced, so as to render sufficient that produced by the weight of the ropes employed. Power may thus be transmitted without loss, even if the driven part of the rope be slack, as is shown in Fig. 24. The guides or conductors D D serve to prevent the rope from getting out of its proper position in case of accident. The tension required when ropes are used is produced by the small pulley, Fig. 15, by applying a weight to it, or by fixing and tightening the rope should it have become slack. This pulley ought to be placed on the slack part of the rope, and should be of larger size if metallic ropes are used. Tension may also be produced by means of the rollers R (shown in Figs. 13 and 14) by placing them near the pulleys, as shown in the arrangement represented in Figs. $22^a$ and $22^b$. In this case the rope adheres completely to the pulley. Either means may be adopted, viz: The rope may be tightened by using the stretcher shown in Fig. 15, or it may be allowed to remain slack, in which latter case the roller of the pulley A is applied as represented in Figs. $22^a$ and $22^b$, and it is absolutely necessary to apply the roller to each end of the rope. The conductor shown in Fig. 17 may also be employed as a stretcher. The conductor is represented in this position by the letters D D, Fig. 24, acting so as to stretch the rope by being placed at the center of the driven part of the said rope, or acting so as to keep it slack on being placed near the pulleys. The tension of the ropes should not exceed what is necessary to keep them taut. This tension may also be obtained by using special pulleys, such as those represented in Figs. 2 to 6, provided they be placed so as to act as conducting-pulleys— that is to say, so as to replace the pulleys which carry the slack rope, as seen by the pulleys A in the arrangements represented in Figs. 19 to 23 and Fig. 25.

In the drawings, Figs. 1 to 11 represent the different kinds of pulleys which may be used for transmitting movement. Figs. 12, $12^a$, $12^b$, $12^c$, $12^d$, $12^e$, $12^f$ represent the pieces which may be applied to existing pulleys so as to utilize them in the present improved system.

Figs. 13 to 15 and 17 and 18 show several auxiliary pieces used in certain cases to effect the transmission of movement.

Fig. 16 represents the graphic rule used to shape the pulleys slightly conical. The cone prevents friction of the metallic ropes, and it contributes in most cases to maintain adherence. In this figure A B represent the circumference of a pulley. B C represent the diameter of the rope employed. A C represent the minimum incline of the cone.

Figs. 19 to 26 show, among other things, several different arrangements of mechanism. Figs. 19 to 26 represent the arrangement of endless ropes. Fig. 26 shows a rope having free ends.

The pulley Fig. 1 is used in conjunction with the rollers 13 and 14, Figs. 22ª and 22ᵇ. The pulleys 2 to 6 not only serve to transmit movement, but also act as stretchers to tighten the rope, as is seen by the pulleys A in Figs. 19 to 23 and in Fig. 25. The pulleys 7 to 11 serve to transmit and invert movement, and also to tighten the ropes. The cones of all the above-mentioned pulleys may be augmented or diminished, if they be concave, like the cone A of the pulleys, Figs. 1, 2, 4, 5, and 6, and they may have an incline of forty-five degrees. If they are straight, like the cone a in Fig. 3, they should not be inclined to such an extent. The cone of a tension and conducting pulley ought to be less accentuated than when the pulley is used for transmitting motive power. The small cones b of Figs. 1, 2, 4, 5, and 6 may also be augmented or diminished up to the limit indicated by the graphic rule shown in Fig. 16. The concave cones shown in Figs. 7, 8, and 9 should form together less than a half-circumference. The straight cones shown in Fig. 10 should form at their point of intersection an angle of less than forty-five degrees. The cone of the pulley Fig. 1 should be constructed by taking as radius the diameter of the rope used when it is desired to transmit movement by means of a slack rope and by the aid of the rollers shown in Figs. 13 and 14. In all other cases the height of the cones should be at least three times the diameter of the rope, and it should be taken into consideration that an elastic rope rises more on the cones than a non-elastic one. The ropes rise more when they act without force being applied, and they rise more on driven pulleys than on the pulleys conveying the motive power and on conducting-pulleys. The rope works better in motor-pulleys and conducting-pulleys if the maximum slope be given to the cone which stops the coil. The ropes are kept better in their places and friction is more completely avoided by using preferably pulleys similar to those represented in Fig. 5, having the small cone b.

I call "motor-pulleys" the pulleys X in the drawings, "conducting-pulleys" the pulleys marked B C in Figs. 19 and 21, and "driven pulleys" the pulleys A, Figs. 19 to 25. The coils tend to slip and unroll themselves laterally. The cones shown in the drawings by the letter a and those shown in Figs. 7 to 11 are destined to stop the coils without any friction. The action of the coils becomes greater according as the diameter of the pulleys decreases or as the diameter of the ropes or their coil round the pulleys is augmented.

The cones shown in Figs. 12 12ª 12ᵇ 12ᶜ 12ᵈ 12ᶠ are subject to the same rules as those laid down for the pulleys. Figs. 12 12ª 12ᵇ 12ᶜ represent pieces which may be placed alongside of or fixed on pulleys in order to adapt the latter to this new system of transmission. Figs. 12ᵈ 12ᵉ 12ᶠ show pieces which may be also placed on pulleys for the same purpose. In this case it is necessary to place four pieces on each pulley at equal distance apart, and each piece should occupy the eighth part of said pulley. All the above-mentioned pieces may be applied either to straight or to convex pulleys generally used with transmission-belts. The rollers 13 and 14, applied to the cones whose height is equal to the diameter of the rope or a little greater than said diameter, Figs. 22ª and 22ᵇ, serve to prevent the ropes from leaving the pulleys. Being applied to the pulleys at the point where the rope passes upon same, as seen in Figs. 22ª and 22ᵇ, they serve to give tension and to transmit movement by means of a slack rope, thus avoiding all possibility of accident.

The arrangement shown in Fig. 15 serves to give tension to the rope if the circumference embraced by said rope be not sufficient, or to tighten it should said circumference be sufficient.

The pulley shown in Fig. 17 represents a conductor which may be variously applied to various uses. For instance, it may be used for turning angles, as shown at D D, Fig. 19. The same conductor becomes a stretcher if it be placed near the pulleys, Fig. 24. It then serves to transmit power by slack ropes, and these ropes are prevented from slipping or leaving the pulleys by the small pieces i i.

Fig. 18 represents a clutching device which, applied to loose pulleys, serves to stop the movement.

Figs. 19, 20, 21, 23, and 25 represent several transmissions effected by means of a complete rope—that is to say, a rope tightened or slightly stretched by means of the pulley A.

Figs. 22ª and 22ᵇ and 24 show transmission effected by means of a slack rope, recourse being had to the pulley shown in Fig. 17.

Fig. 23 represents an arrangement for changing the velocity of the movement.

Fig. 26 shows the mode of transmission by a rope having both its ends free. It is to be remarked that one of the ends of the rope rises while the other descends. The ropes are wound round the pulleys in various ways. A single rope may be coiled round two or more pulleys. When the rope is wound round two pulleys the coils should be laid in opposite directions, so as to form together one endless coil, as shown in Figs. 20, 22ª and 22ᵇ, 24, and 25. If the rope passes over more than two pulleys, it should be wound round the last pulley—that is to say, the driven pulley—in such a way that the coil shall receive its tension in a direction opposed to that of the coil on the motor-pulley, so as to form one general endless coil, as shown in Figs. 19 and 21. In order to invert the movement, the rope is wound as shown in Fig. 21. More than one rope may be placed on each pulley in order to change the speed of the movement, as shown at x in Fig. 23. The ropes act on the pulleys whether they be elastic or not.

This invention comprises also cables, wires, cords, chains, and all other similar means of transmission—that is to say, all organs of transmission, whether composed of vegetable, animal, or mineral fibers.

I claim—

1. The concaved pulleys having the rope or belt coiled around them, in combination with the tension-pulley D, substantially as and for the purposes set forth.

2. In combination with the conical motor-pulley X and the conical driven pulley A, the rollers R, placed near the pulleys and applied to each end of the rope or belt so as to produce tension, as set forth.

3. In combination with the pulleys A and X, the pulleys B, C, and D, for rounding angles and for tightening the rope or belt, substantially as described.

4. The concaved motor-pulley X, in combination with the pulleys $y$ $y$ and the rope or belt wound around the pulley X, and having its ends free and weighted, substantially as and for the purposes set forth.

ANTONIO SAMPER.

Witnesses:
ROBT. M. HOOPER,
JEAN BAPTISTE ROLLAND.